United States Patent Office 3,302,181
Patented Jan. 31, 1967

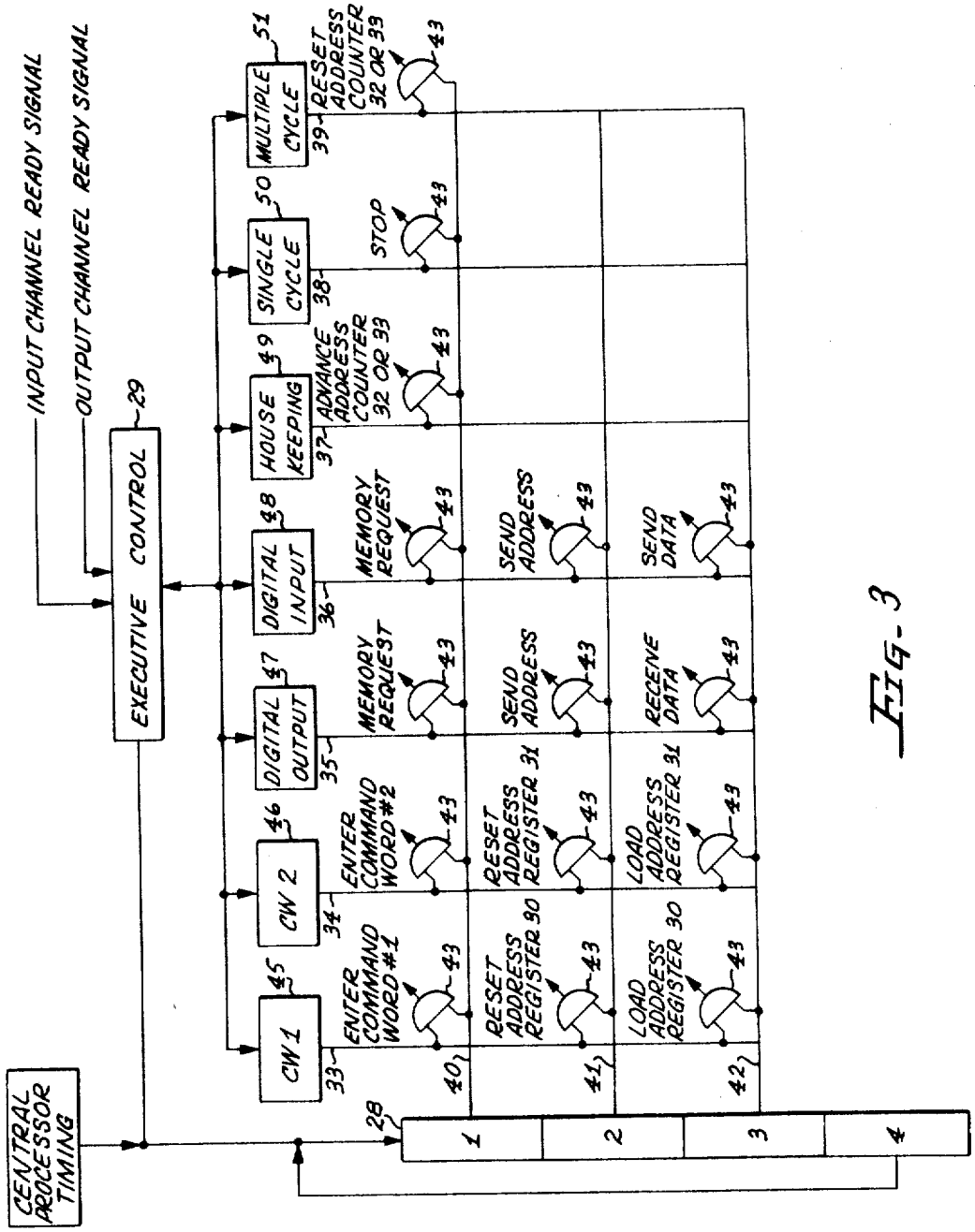

3,302,181
DIGITAL INPUT-OUTPUT BUFFER FOR COMPUTERIZED SYSTEMS
Henry P. Lee, Phoenix, Ariz., assignor to General Electric Company, a corporation of New York
Filed June 17, 1963, Ser. No. 288,239
12 Claims. (Cl. 340—172.5)

The present invention relates to data processing systems and particularly to such a system having a general purpose computer which operates in real time and on line with outside equipment such as stress sensors for an aircraft under high speed flight conditions.

The critical timing of high speed reactions resulting from the foregoing application makes it increasingly important to instantaneously interrupt the computer of a data processing system upon receipt of a signal indicating a critical state or out-of-limit condition of the object being sensed.

In order to illustrate the application of the present invention, a simple illustration is shown and described and includes a steam boiler, a fuel valve and stress gage. If such a gage is capable of generating an alarm signal when the gage exceeds a given limit, then the alarm signal immediately interrupts the current operation of the computer. Upon such interruption, the computer initiates a corrective operation for adjusting the fuel valve for the boiler. If however, the stress gage is not capable of generating its own alarm or out-of-limit signal but only electrical signals or voltages representing the condition of the object being sensed, the system of the present invention is capable of initiating an interrupt operation within the computer itself by comparison of the input data with a predetermined limit. The interrupt operation then initiates a corrective operation for adjusting the fuel valve.

A tyical data processing system consists of a general purpose computer and its memory unit, which serve as a central processor for the system, and one or more peripheral input-output controllers and their associated peripheral devices which receive, transmit, store, record and convert data in various forms as required by the central processor and peripheral devices. The peripheral input-output controllers receive controller commands from the central processor and respond thereto for controlling the transfer of data in either direction between the processor memory and the peripheral devices.

In prior art systems, once execution of a peripheral controller command is initiated, the central processor relinquishes control over the controller and is unable to interrupt its operation until the command being executed is completed. In the system embodying the present invention, the central processor has the capability of instantaneously interrupting the peripheral controller at any time during execution of the command in progress and concurrently initiating execution of a new controller command for modifying the operation of a peripheral device.

Again referring to prior art systems, the peripheral controller can interrupt the central processor only at the end of execution of the current controller command, whereas in the system embodying the present invention a peripheral device can interrupt the central processor by sending an alarm signal through the input-output controller to the central processor without interrupting the operation of this controller until such time as the central processor transmits a new command with interrupt status.

It is therefore an object of the present invention to provide apparatus for interrupting the execution of a computer operation at any stage thereof by an alarm signal originating from a peripheral device.

It is a further object of the invention to provide apparatus for interrupting execution of an input-output command by a peripheral controller at any time and to enter a new command in the controller by the successive transmission of an interrupt signal and a new command from the central processor memory to the controller.

It is another object of the invention to provide apparatus for controlling the transfer of data between a data processor memory and a peripheral device, wherein at any time during such a transfer the memory region involved in the transfer may be relocated.

Further objects and advantages of the present invention will become apparent as the description thereof proceeds.

The invention will be described with reference to the accompanying drawings, wherein:

FIGURE 3 is a detailed block diagram of the control matrix shown in FIG. 2.

Figure 1:
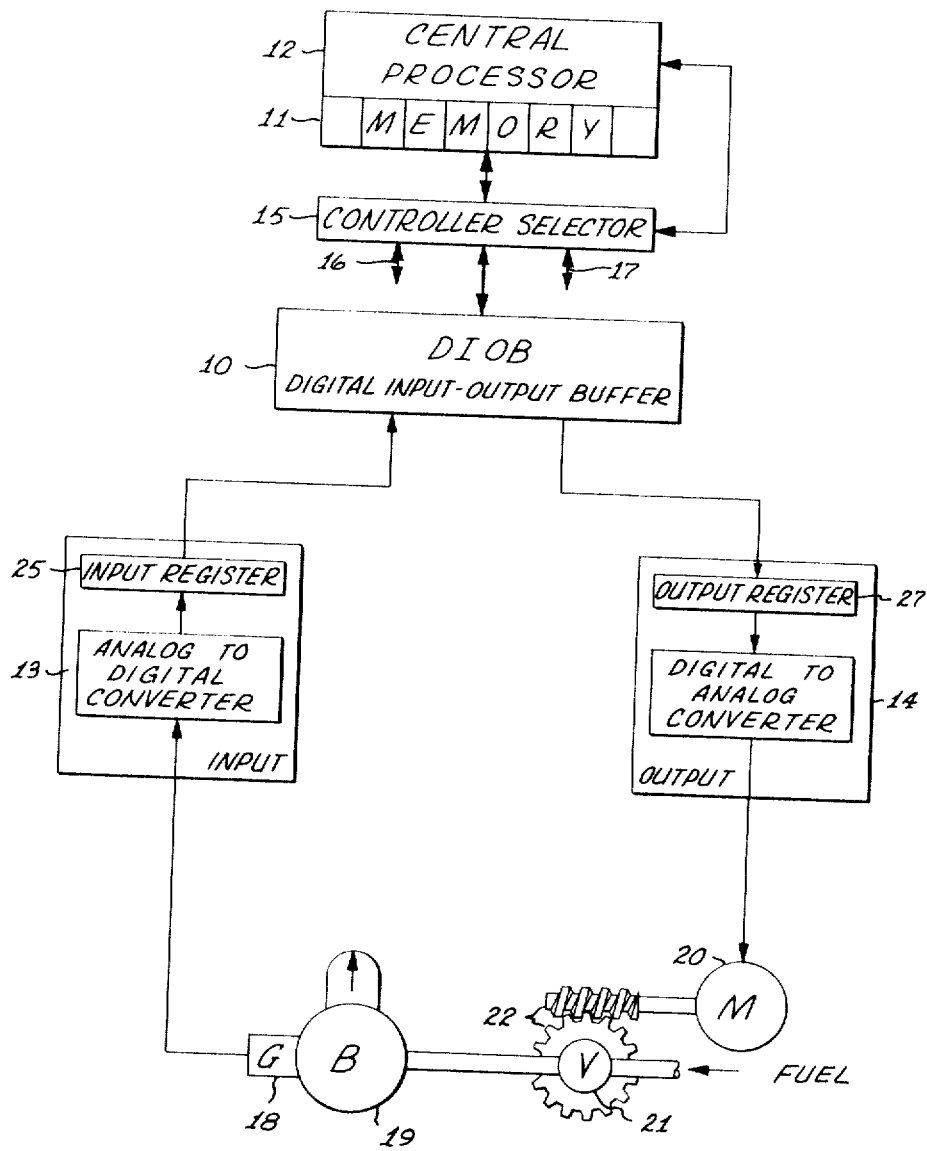
FIGURE 1 is a block diagram of a data processing system embodying the invention.

Referring more particularly to the drawings by characters of reference, FIG. 1 discloses a data processing system providing apparatus comprising a digital input-output buffer for controlling data transmission between a data storage means such as memory 11, memory 11 being controlled by a central processor 12, and a pair of peripheral devices 13 and 14. The central processor 12 may be any suitable general purpose digital computer which is capable of processing either or both alphanumeric and binary information. The central processor provides central control, performs arithmetic computation, and provides rapid random access to memory 11 for data storage and retrieval for the system shown. The commands to be executed and the data to be operated upon are stored in memory 11, which may, for example, comprise a three dimensional array of magnetic cores, wherein each core, depending upon its direction of magnetization, represents a binary digit (bit) of a command or data word, the word being the basic unit of addressable information in the memory. For a more detailed description and operation of memory 11 and central processor 12, reference is made to application Ser. No. 191,573, filed May 1, 1962 by David W. Masters and entitled Priority Arrangement assigned to the assignee of this application.

The ability of the system of FIG. 1 to incorporate a plurality of different peripheral devices is accomplished by means of a common connecting device, i.e., a controller selector 15. Controller selector 15 is a common control and switching center for a plurality of peripheral controllers such as, for example, the digital input-output buffer 10 shown and other peripheral controllers (not shown) which are connected to controller selector 15 through one or more information flow lines 16 and 17. Peripheral controllers control, transmit data to, and receive data from peripheral units, such as high speed printers, magnetic tape systems, paper tape readers and punches, etc.

Digital input-output buffer 10, which for the sake of brevity may be referred hereinafter to as DIOB, is a peripheral controller for controlling the transmission of digital information from a first peripheral unit, such as input device 13, to memory 11 and the transmission of digital information from memory 11 to a second peripheral unit, such as output device 14. Digital input information for a binary digital computer system may originate from peripheral devices which generate analog input data, such as voltage signals, wherein such analog data are converted to binary digital values for entry into the memory. Digital outputs from the memory may be provided to converters for decimal displays, analog outputs, etc.

The ability of the DIOB to provide maximum utilization of its interrupt and data transfer capabilities requires use of input and output peripheral devices 13 and 14 which can furnish or receive essential control signals. The data transfer function of the DIOB requires that the DIOB receive control signals indicating that the input or output device is "ready" to send or receive digital through the DIOB to or from the central processor memory. In order that the DIOB effect interruption of central processor operator for conditions of alarm, the input or output devices 13 or 14 must be capable of originating the necessary control signals. Accordingly, input and output devices 13 and 14 have some means of detection of alarm and generation of an alarm interrupt signal from instrumentation sensors such as high or low power detectors, gages, meters, switches, etc.

The DIOB 10 shown in FIG. 1 is connected to input peripheral device 13, which, in turn, is connected to a strain gage 18, for example. Strain gage 18 is physically associated with industrial equipment, such as a steam boiler 19. The DIOB 10 is also connected to output peripheral device 14, which is connected, for example, to an electric motor 20. Electric motor 20 controls a valve 21 of the fuel input line to broiler 19 through a worm gear 22. Although a boiler, strain gage and fuel feed control valve are shown as an example of a device furnishing and using information transmitted to and from memory 11 by the DIOB 10, it is intended to be within the scope of this invention to provide for the transfer and control of data between memory 11 and any type of device capable of generating or receiving information or both. Although the DIOB 10 is shown associated with an input peripheral device 13 and an output peripheral device 14, two input devices or two output devices may be used with DIOB 10 in place of the shown input and output devices 13 and 14.

The DIOB 10 controls the transfer of digital information to and from memory 11 on a time and space shared basis with central processor 12 and other peripheral controllers, in accordance with respectively allocated priorities. DIOB 10 provides a means for obtaining access to memory 11 independently of central processor control, once the DIOB operation has been initiated by the central processor. After DIOB 10 has been set into operation by receipt of specific comamnds from central processor 12, such commands including instructions as where to store in or retrieve from memory 11 digital information, DIOB 10 remains able to change its operation at any time by responding to interruptions created by new commands from the central processor, and the DIOB is able to interrupt the operation of the central processor at any time to indicate an alarm condition signalled by input or output devices 13 and 14.

In order for central processor 12 to extract information from memory 11 and to execute commands in an orderly and sequential manner, a definite time basis for these operations is provided, such as a series of recurring electrical pulses. The pulse repetition rate for central processor operations may be a frequency such as 450 kc. whereby the period between pulses is approximately 2.25 microseconds. In the system embodying this invention, eight consecutive periods may comprise a basic unit of time customarily designated as a "word time." Therefore, such word time is approximately of 18 microseconds duration.

Two or more asynchronous operations may be performed alternately, simultaneously, or a combination of both by DIOB 10, such as transferring data to memory 11 from input device 13 or transferring data from memory 11 to output device 14. These operations occur at a relatively slow rate compared to the 450 kc. central processor repetition rate. Inasmuch as only one storage location in memory may be addressed and communicated with at any one time, and since several requests for memory access may occur at the same time by the central processor and various peripheral controllers, provision is made in the system of this invention to grant only one such request for memory access during a given word time.

The granting of a request for memory access among the various peripheral controllers is dependent upon the priority allocation scheme built into controller selector 15. Highest priority is allocated to the peripheral controller controlling peripheral devices with the highest operating speed. Generally, input peripheral devices receive priority over output peripheral devices. The resolution of priority between input device 13 and output device 14 for memory access is provided by DIOB 10. If a request for access to memory 11 is received simultaneously from input and output devices 13 and 14, input device 13 will be granted access first, since its data flow is considered perishable and cannot be delayed without danger of loss of information. Memory access for output device 14 can be delayed since the data requested is already stored in memory.

*General operation*

Figure 2:
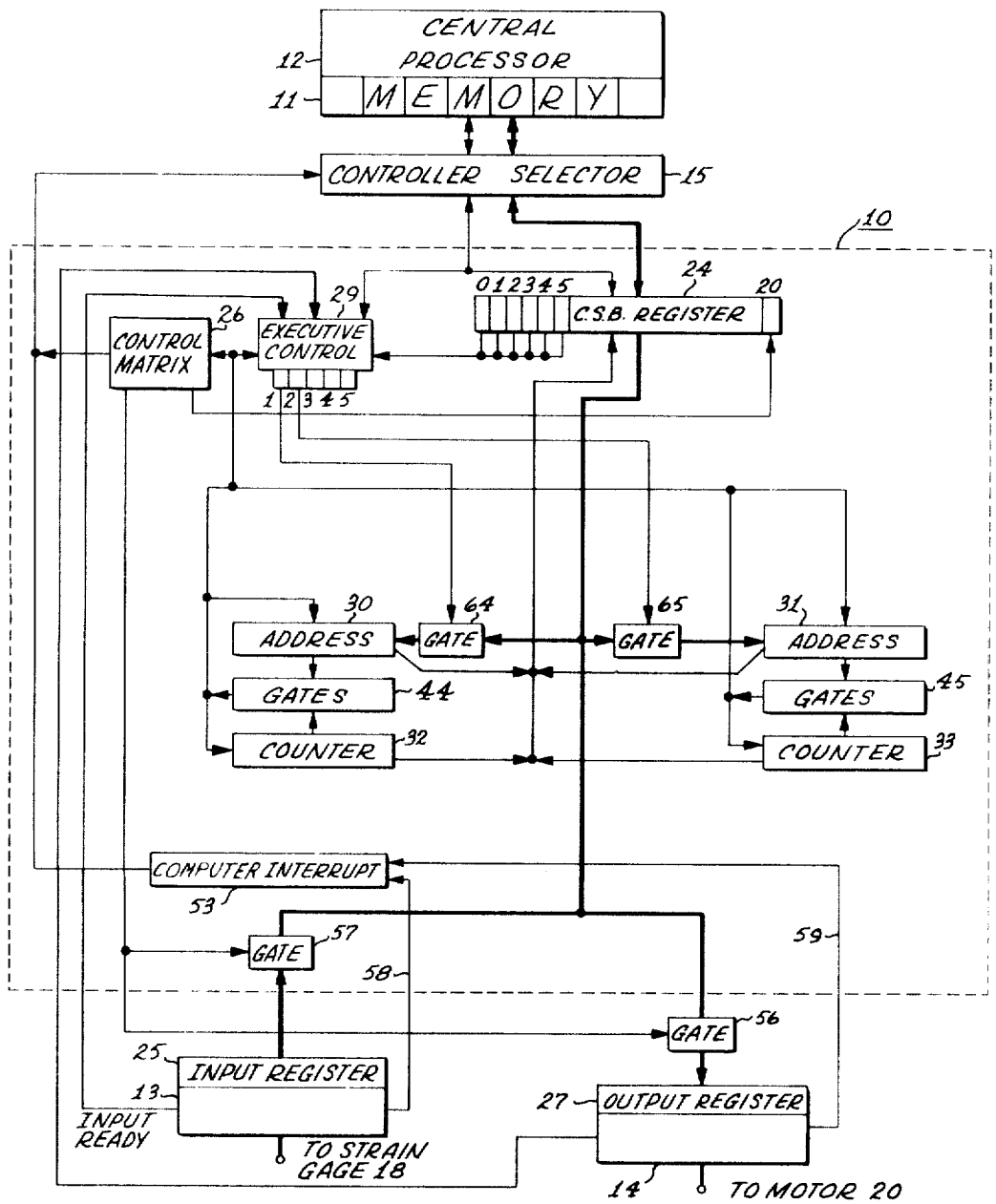
FIGURE 2 is a more detailed block diagram of the digital input-output buffer shown in FIG. 1.

Central processor 12 initiates operation of DIOB 10 by executing a "select" command, which specifies DIOB 10 as the peripheral controller whose operation is to commence. During the execution of the "select" command two 21 bit controller commands are sequentially transferred from denoted memory locations and routed by means of logic circuits through controller selector 15 to the controller selector buffer register 24, shown in FIG. 2. Bits 0 through 5 of each such controller command word may be considered as containing the control portion of the command while bits 6 through 19 may be considered as containing the memory address portion. Bit 20 of each command word is used for parity checking. The first command word transferred to register 24 specifies an input operation and the starting and ending address of a memory 11 region into which the input data from the input device 13 is to be stored. The second command word transferred to register 24 specifies an output operation and the starting and ending address of a memory region storing the data to be transferred to output device 14.

When the digital input register 25 of the input peripheral device 13 is ready to transmit information, input device 13 transmits a ready signal to DIOB 10, which then provides a signal requesting access to memory 11 through the controller selector 15. When access to memory is granted, controller selector 15 sends a priority select signal back to DIOB 10. The starting address for storing input information in memory 11, which was specified in the first controller command word, is then transferred through the controller selector 15 to the memory address register. Twenty bits of digital input data plus one parity bit generated by DIOB 10 are next transferred to the location in memory specified by the starting address. Another input data transfer from DIOB 10 to memory 11 is made each time input device 13 sends a ready signal. Storage of this data in memory 11 occurs in consecutive memory locations following the specified starting address location. At regular intervals central processor 12 may obtain access to memory 11 for reading out the input data stored to check such data against stored limit values.

If, now, central processor 12 senses an out-of-limit condition in boiler 19, for example, the central processor will select a series of correction operations from the memory. This series includes a DIOB 10 "select" command which provides two new controller command words to interrupt the operation of DIOB 10. The new controller command words specify an output operation for corrective action and will be described more fully hereinafter.

*Detailed operation*

Prior to execution of the DIOB 10 "select" command by central processor 12, a series of checks are made by the central processor through controller selector 15 to determine operating conditions and availability of the DIOB. This testing is accomplished by branch interrogations of the DIOB 10. Reference is made to the above identified copending application, Ser. No. 191,573, and application, Ser. No. 191,619, filed May 1, 1962 by John H. Fields, Charles H. Propster, Jr. and David W. Masters, entitled Data Processing System and assigned to the assignee of this application for details of a controller selector structure suitable for use with the disclosed DIOB.

When the central processor selects the DIOB, the DIOB is alerted that two controller command words will be received from memory 11. These two command words contain information which enables DIOB 10 to perform the operations for which it has been selected. Various positions of the command words are used to specify DIOB input or output operation and other action required during operation. Bit positions may have one of two possible conditions; i.e., a particular bit position of a command word may represent a binary one or zero.

When the DIOB "select" command is executed by central processor 12, operation of the control matrix 26 (FIG. 2) is initiated. Matrix 26 controls each step of the DIOB operation. The control matrix operates in accordance with bits 1 through 5 of the two controller command words received from memory. Digital input and output transfer is directed by control matrix output signals.

FIGURE 3 illustrates a block diagram of control matrix 26. Matrix 26 employs a four stage ring shift register 28. Register 28 provides step control for matrix 26. An executive control 29 provides sequence control for matrix 26. The following sequential operations are directed by matrix 26:

(1) Controller command word 1 is transferred from memory 11 through controller selector 15 to register 24. If bit position 1 represents a binary 1, bits 6 through 19 of the command are transferred into address register 30.

(2) Controller command word 2 is transferred from memory 11 through controller selector 15 to register 24. If bit position 2 represents a binary 1, bit 6 through 19 of the command are transferred into address register 31.

(3) If input device 13 generates a ready signal, an input operation is performed, or if output device 14 generates a ready signal prior to a ready signal of the input device, an output operation will be preformed: if both input and output devices 13 and 14 generate ready signals at the same time, the input operation will be performed on priority basis of input before output.

(4) After each word has been read into or out of memory, a test is performed to determine whether the memory location used corresponds to the ending address in the respective one of registers 30 and 31. If the test is negative, a housekeeping sequence is entered, but if the test is positive, a single or multiple cycle sequence is entered, according to the operation specified originally in the respective command word.

Matrix 26 (FIG. 3) comprises a plurality of column control lines 33 through 39, a plurality of row control lines 40, 41, and 42, and an "and" gate 43 at each crossover of a row and column control line. Reference is made to U.S. Patent 3,077,984, granted Feb. 19, 1963, and entitled Data Processing System, filed by R. R. Johnson for detailed description of suitable gates. When a column and a row control line are energized, the resulting output signal of the corresponding gate 43 is used to control the operation designated by the arrow from such gate. The ring shift register 28 successively energizes row control lines 40 to 42, and the executive control 29 selectively energizes column control lines 33 to 39 by enabling logic blocks CW1, CW2, etc., identified by reference characters 45 through 51 at the top of the column control lines. Executive control 29 and matrix 26 constitute a control means for controlling operation of DIOB 10.

Timing signals for starting and synchronizing matrix 26 are obtained through the controller selector 15 from the central processor 12, since timing is synchronized with the central processor during memory access, communication and control operation. The executive control 29 provides the further control for changing the DIOB from certain operating sequences to others, once input and output operations have commenced.

Consider, now, a step-by-step description of the operation of DIOB 10. The DIOB "select" command executed by central processor 12 connects DIOB 10 to the controller selector 15 (FIG. 2) and prepares DIOB 10 to receive two controller command words from memory 11. These two command words are then transferred sequentially from memory 11 through controller selector 15 into buffer register 24.

Shift register 28 (FIG. 3) is initially preset to its first state when DIOB 10 is idle. During execution of the "select" command, central processor 12 delivers a select signal to DIOB 10. The select signal initiates operation of the DIOB through executive control 29 by setting the flip-flop of the CW1 (command word 1) logic block 45, which flip-flop remains set while ring shift register 28 shifts through a complete cycle and resets when register 28 returns to its 1 state.

Since register 28 is preset to its first state, the setting of the CW1 logic block flip-flop enables the "and" gate of control lines 33 and 40. The output signal of this "and" gate enables the receipt of the first controller command word by buffer register 24. Buffer register 24 comprises 21 bistable elements, such as flip-flops, to receive and store an information word of 21 bits, such as the controller command word.

The next-received central processor synchronizing signal, which is called a pre-command signal, folows receipt of the first command word by DIOB 10, and advances the registers 28 from its first state to its second state. Bits 1 and 3 of the first command word in register 24 are then sensed by the executive control 29. If bit 1 is a binary 1, address register 30 and address counter 32 are cleared. If bit 3 is a binary 1, a later single cycle sequence is predetermined by resetting a first "multiple cycle" flip-flop in the executive control 29. The clearing of register 30 and counter 32 and the resetting of the first "multiple cycle" flip-flop are controlled by the output signal of the "and" gate 43 of control lines 33 and 41.

The next-received central processor synchronizing signal, which is called a memory sample signal, advances register 28 to its third state. The "and" gate of control lines 33 and 42 now delivers an output signal. If bit 1 of the first controller command in a binary 1, the output signal of the "and" gate of control lines 33 and 42 is enabled to open gate 64 which transfers address bits 6 through 19 of the first controller command in buffer register 24 to address register 30. Additionally, the third bit of the first command word in register 24 is again sensed by executive control 29, and if this bit is a binary 0, the first "multiple cycle" flip-flop is set.

If bit 1 of the first controller command is a binary 0, register 30 and counter 32 are not cleared and no information is transferred from register 24 to register 30. The next-received central processor synchronizing signal causes register 28 to be advanced to its first state and effects the resetting of the flip-flop of the CW1 logic block.

The next timing signal from central processor 12 enables the executive control 29 to set the flip-flop of the CW2 (command word 2) logic block 46, which flip-flop remains set while ring shift register 28 shifts through a complete cycle and resets when register 28 returns to its 1 state.

Operation of DIOB 10 during this CW2 sequence is similar to the operation described above for the CW1 sequence. During the CW2 sequence, register 31 and counter 33 are cleared and address bits 6 through 19 of the second command word are transferred from the buffer register 24 through gate 65 to register 31 if the second bit of the command word is a binary 1. Additionally, a second "multiple cycle" flip-flop is set in accordance with the third bit of the second command word.

After completion of the CW1 and CW2 sequences, either or both of address registers 30 and 31 contain the address portion of the respective first and second controller command words. The 14 bit address information which is stored in registers 30 and 31 represents the starting and ending addresses of a respective memory 11 region or block into which data is to be entered or from which data is to be received. This address information represents any one of 16 memory blocks, each block containing 1024 storage locations. The address information always specifies that the starting address for memory access is the first, or lowest numbered, location in the block. The ending address may identify any one of the 1024 locations in the block. Bits 0 through 3 represent the four most significant bits of both the starting and ending addresses. The address counters 32 and 33 supply the ten lower order bits for the two starting addresses, whereas bit positions 4 through 13 of address registers 30 and 31 supply the ten lower order bits for the two ending addresses.

Inasmuch as counter 32 or 33 is cleared whenever new address information is entered into a respective one of registers 30 or 31, the starting memory address is always an integral multiple of 1024. The ending address is the same multiple of 1024 plus the controls of bit positions 4 through 13 of address registers 30 and 31.

The current address for an input operation is identified by the four bits in positions 0 through 3 of register 30 and ten bits in counter 32. Similarly, the current address for an output operation is identified by the four bits in positions 0 through 3 of register 31 and the ten bits in counter 33. After each input word transfer, a coincidence test is performed to determine whether the contents of counter 32 are the same as the contents of bit positions 4 through 13 of register 30. If coincidence is not found, a housekeeping sequence increments by unity the contents of counter 32. If coincidence is found, a single or multiple cycle sequence is entered. Similarly, after each output word transfer, the contents of counter 33 are compared with the contents of bit positions 4 through 13 of register 31 and the contents of counter 33 are incremented by unity, or a single or multiple cycle sequence is entered according to the results of the comparison.

Following the receipt and processing of the two controller command words, the next operational sequence of DIOB 10 depends on whether one of the input or output devices 13 or 14 is ready to receive or send information. Input data has priority over input data since data might be lost if it is not entered into memory promptly. When input data is ready to be transmitted to memory 11, the input device 13 (FIG. 2) generates a ready signal which is transmitted to the executive control 29 to set the flip-flop of logic block 48 (FIG. 3), which flip-flop remains set while ring shift register 28 shifts through a complete cycle and resets when register 28 returns to its 1 state. Since the shift register 28 is intially in first state energizing line 40, the output signal of the "and" gate 43 of control lines 36 and 40 requests the controller selector 15 for access to memory 11. When memory access is granted to DIOB 10, which is at the end of the current memory cycle, the next following timing signal from central processor 12 shifts register 28 to its second state. The output signal delivered by the "and" gate of control lines 36 and 41 causes transfer of the starting memory address through register 24 and to the memory address register. This memory address comprises the bits stored in the four most significant positions of register 30, which are transferred into bit positions 6 through 9 of register 24, and the ten bits stored in counter 32, which are transferred into bit positions 10 through 19 of register 24. The twentieth bit position of buffer register 24 is set by the signal from the control matrix 26 and this twentieth bit is transferred with the address to the memory address register to denote that there is to be an input to memory.

Central processor memory synchronizing signals which include both a "memory store" signal and "data sync" signal, next advances register 28 (FIG. 3) to its third state, thereby energizing line 42. The output signal of the "and" gate 43 of control lines 36 and 42 enables gate 57 (FIG. 2) which allows the transfer of 20 bits of digital information plus a parity bit from input register 25 through register 24 to memory 11. A coincidence test of the type described heretofore is performed by coincidence gates 44 to determine whether the memory ending address stored in register 30 is the same as the current memory address into which data has just been transferred. If equality is not found, the flip-flop in logic block 49 is set upon receipt of the next timing pulse from the central processor, whereupon DIOB 10 enters a housekeeping sequence wherein the contents of counter 32 are incremented by unity to denote the next successive location in memory where the next input word is to be stored. If equality is found, DIOB 10 enters a single or multiple cycle sequence to be described hereinafter.

Address counter 32 is advanced one count each time an input data word is transferred to memory 11, until the counter 32 contents are equal to the contents of bit positions 4 through 13 of register 30. This equality, when detected by coincidence gates 44 indicates that the last input word has been stored in the memory location denoted by the memory ending address, whereupon DIOB 10 enters a single or multiple cycle sequence.

Assuming now that output device 14 sends a ready signal to executive control 29. This output ready signal indicates that output device 14 is ready to receive digital output data from memory 11.

Upon receipt of an output ready signal at executive control 29, the flip-flop of logic block 47 is set, which flip-flop remains set while register 28 shifts through a complete cycle and resets when register 28 returns to its 1 state. With register 28 in its first state, a memory access request is sent to controller selector 15 from the "and" gate of control lines 35 and 40 (FIG. 3). Upon receipt of a priority select synchronizing signal from the central processor, which grants DIOB 10 access to memory 11, register 28 is transferred to its second state, thereby energizing control line 41. The output signal delivered by the "and" gate of control lines 35 and 41 causes transfer of the current memory address for output data through register 24 to the memory address register. Accordingly, the bits stored in the four most significant positions of register 31 are transferred into bit positions 6 through 9 of register 24 and the ten bits of counter 33 are transferred into bit positions 10 through 19 of register 24.

A memory sample synchronizing signal from central processor 12 next advances the register 28 to its state 3, thereby energizing line 42. The output signal of the "and" gate 43 of control lines 35 and 42 enables gate 56, which allows the transfer of 20 bits of output data from memory 11 through the register 24 to output device 14. A coincidence test is performed by coincidence gate 45 to determine whether the memory ending address stored in register 31 is the same as the current memory address from which data has just been transferred. If equality is not found, the flip-flop in logic block 49 is set upon receipt of the next timing pulse from the central processor, whereupon DIOB 10 enters a housekeeping sequence wherein the contents of counter 32 are incremented by unity to denote the next sucessive location in memory where next output word is stored. If equality is found, DIOB 10 enters a single or multiple cycle sequence.

Upon the occurrence of a positive coincidence test at the completion of an input or output data word transfer, indicating that the corresponding ending memory address has been employed, control of the DIOB advances either to the single cycle sequence to terminate the particular operation or to the multiple cycle sequence to repeat the particular operation just completed in the same memory block. Control over whether the particular operation is to be terminated or repeated is preset in the first and second "multiple cycle" flip-flops of executive control 29 during the respective CW1 and CW2 sequences, as described previously. If the first "multiple cycle" flip-flop is not set when address coincidence is detected during an input sequence, when register 28 returns to its 1 state, the flip-flop of logic block 50 (FIG. 3) is set. A single cycle sequence is then executed wherein the "and" gate 43 of control lines 38 and 40 delivers an output signal to terminate the data input operation. If, however, the first "multiple cycle" flip-flop is set at the time address coincidence is detected, the flip-flop of logic block 51 is set. A "multiple cycle" sequences is then executed wherein the "and" gate of control lines 39 and 40 delivers an output signal to clear counter 32, and provide a representation of the starting memory address for the block into which data has just been transferred. The second "multiple cycle" flip-flop controls a similar set of sequences when coincidence is detected during an output sequence.

Interruptions

The central processor can interrupt, modify, or alter the operation of DIOB 10 and in so doing it can interrupt an input data transfer operation or an output data transfer operation, or both. This interruption can be effected instantaneously by the DIOB if, for example, an out-of-limit condition of an outside device is detected by comparison of the input data with given limit information or if an alarm signal from a sensor output device has been received. Conversely, if the DIOB receives an alarm signal from an outside peripheral device, it can immediately interrupt the central processor at the completion of any central processor command being executed.

Interruption of the DIOB by the CENTRAL PROCESSOR

Instantaneous interruption of the DIOB by the central processor is possible at any time during an input or output operation. Interruption is initiated by central processor 12, and this interruption may be for any one of several reasons. This interruption may only be long enough to enter two new command words into DIOB 10, so as to initiate a corrective operation through the output device 14; the interruption may be to change the location in memory into which the input data is to be stored or from which output data is to be retrieved; the interruption may be to change from single cycle to multiple cycle operation; or the interruption may initiate a "halt" of DIOB operation.

Interruption is initiated by central processor 12 when it executes a new "select" command during a time when an input or an output operation, or both, is being executed by DIOB 10. The select signal delivered during the "select" command causes the setting of the flip-flop of the CW1 logic block through executive control 29. The signal which sets the CW1 logic block flip-flop may be termed an interrupt signal. With this flip-flop set, the flip-flops of logic blocks 47 and 48 cannot be set and input and output sequences cannot take place until the interrupt phase has terminated. When register 28 returns to its 1 state, a CW1 sequence starts and a new first controller command word is received from the central processor by register 24. If the first bit of this command word is a binary 1, address register 30 and counter 32 are cleared and the address portion of the command is transferred into register 30, as described in the previous description of the CW1 sequence. Again if this first bit of the command word is a binary 0, the contents of register 30 and counter 32 are not affected. In addition to the normal functions during the CW1 sequence, when register 28 is in its third state, a halt of operation is made optional. During this third state, the fifth bit in buffer register 24 is sensed. If bit 5 is a binary 1, the DIOB proceeds into its CW2 sequence. If, however, bit 5 is a binary 0, DIOB 10 halts and remains inoperative until a new "select" command is executed by the central processor.

If the DIOB continues into its CW2 sequence, the address of the second command word may or may not be entered into address register 31, according to the state of the second bit of the second command word, as described in the previous description of the CW2 sequence. Again, the fifth bit of the second command word is sensed when register 28 is in its third state to provide an optional halt. If this fifth bit is a binary 1, the DIOB proceeds into its input or output sequences, but if the fifth bit is a binary 0, DIOB halts, remaining inoperative until a new "select" command is executed by the central processor.

If two command words are received by DIOB 10 during the interrupt phase, a new, modified, or unchanged input or output data transfer operation may be resumed. It is possible during this interrupt phase to enter no addresses, thus leaving memory location access unchanged, to enter only one new address for changing input or output memory location access, or to enter two new addresses for changing both input and output memory location access. Finally, in addition to the preceding possibilities during the interrupt phase, it is possible to halt DIOB 10 either after the CW1 sequence or after the CW2 sequence, and no further DIOB operation will occur until a succeeding "select" command is executed by the central processor.

Interruption of the CENTRAL PROCESSOR by the DIOB

An out-of-limit or emergency condition may be detected by either the outside peripheral device, which generates an "alarm" signal and transmits the signal to the central processor, or the condition may be done by the central processor itself. The condition is detected by the central processor through comparison of input data with stored limit values. When this occurs, the central processor initiates its own alarm signal to interrupt its current operation and execute a corrective action.

When DIOB 10 receives an alarm signal from a connected peripheral device, it transmits the signal directly to central processor 12 for instantaneously interrupting the central processor program, but the DIOB continues its operation without interruption. At the proper time the central processor initiates a DIOB interrupt phase to alter operation of DIOB 10 for taking corrective action.

This alarm central processor interruption is accomplished when a peripheral device alarm signal is sent to the automatic computer interrupt logic 53 through conductors 58 or 59. This signal from the peripheral device sets an interrupt flip-flop in logic 53 without interfering with DIOB 10 operation and without requiring the DIOB to generate a transmission enabling signal. Thus, there is no interruption of input or output data transfer through the DIOB. The alarm signal received by logic block 53 is sent directly to the controller selector 15 for detection by the interrupt circuits of the central processor. These interrupt circuits constantly monitor the controller selector outputs to instantaneously detect and interrupt the central processor program when an alarm signal occurs. If, upon processing the alarm, corrective action is to be taken through DIOB 10, an appropriate "select" operation for the DIOB is executed by the central processor. DIOB 10 then transmits corrective data from memory 11 to the peripheral device. When the out-of-limit condition has been corrected in the peripheral device, another DIOB "select" operation by the central processor restores DIOB operation for normal data transfer operations.

While the principles of the invention have now been made clear in an illustrative embodiment, there will be immediately obvious to those skilled in the art many modifications of structure, arrangement, proportions, the ele-

What is claimed is:

1. An apparatus for controlling the transfer of data between at least one peripheral device and a central processor which includes a memory having a plurality of data storage locations, said apparatus comprising; address register means for representing an address of a group of said plurality of storage locations of said memory, control means comprising logic circuits for receiving signals representing a data transfer operation to be executed between a peripheral device and said memory, means for initiating said transfer operation between said peripheral device and the group of said memory storage locations which is represented by said address register, said control means including means for receiving a signal from the central processor and in response to receipt of said signal to reset the address register means during execution of a transfer operation then in progress.

2. An apparatus for controlling the transfer of data between at least one peripheral device and a central processor which includes a memory having a plurality of data storage locations, said apparatus comprising; data transfer means for receiving from said central processor a command comprising a plurality of signals specifying a particular data transfer operation, and responsive to a first group of said signals of said command to transfer data between said peripheral device and a region of said memory; register means for storing address data representing said region of said memory; means for transferring a second group of said signals to said register means; address transfer means for tranferring said address data from said register means to said memory for controlling access of said data transfer means to said region; and control means for receiving further commands comprising a plurality of signals from said central processor and responsive to said latter signals for halting operation of said apparatus during execution of said command.

3. An apparatus for controlling the transfer of data between at least one peripheral device and a central processor which includes a memory having a plurality of data storage locations, said apparatus comprising; data transfer means for receiving from said central processor commands each comprising a plurality of signals specifying a particular data transfer operation, and responsive to a first group of said signals of said command to transfer data between said peripheral device and a region of said memory; a pair of registers for storing address data representing said region of said memory; one of said address registers controlling the transfer of data from said peripheral device to said data storage locations and the other of said address registers controlling the transfer of data from said data storage locations to said peripheral device, means for transferring a second group of said signals to one of said registers; address transfer means for transferring said address data from one of said registers to said memory for controlling access of said data transfer means to said region; and control means for receiving further commands comprising a plurality of signals from said central processor and responsive to said latter signals for modifying the address data in at least one of said registers to represent a different region of said memory during the execution of said commands.

4. An apparatus for controlling the transfer of data between at least one peripheral device and a central processor which includes a memory having a plurality of data storage locations, said apparatus comprising; data transfer means for receiving from said central processor a command comprising a plurality of signals specifying a particular data transfer operation, and responsive to a first group of said signals of said command to transfer data between said peripheral device and a region of said memory; register means for storing address data representing said region of said memory; means for transferring a second group of said signals to said register means; address transfer means for transferring said address data from said register means to said memory for controlling access of said data transfer means to said region; control means for receiving further commands comprising a plurality of signals from said central processor and responsive to one of said latter signals for modifying the address data in said register means to represent a different region of said memory during execution of said command and another of said latter signals for halting operation of said apparatus.

5. An apparatus for controlling the transfer of data between at least one peripheral device and a central processor which includes a central memory having a plurality of data storage locations, said apparatus comprising; a buffer register for receiving data in the form of command words provided by said central processor, circuit means connecting said buffer register to a pair of address registers for receiving signals from said buffer register, said signals representing the address of a block of said plurality of storage locations, one of said address registers controlling the transfer of data from said peripheral device to said data storage locations and the other of said address registers controlling the transfer of data from said data storage locations to said peripheral device, control means comprising logic circuits for receiving signals representing the data transfer operation to be executed, means for initiating said transfer operation controlling the transmission of data between said peripheral device and a selected one of said memory storage locations which is represented by said address registers, said control means including a device for receiving a signal from the central processor and effective in response to receipt of said signal to control the resetting of at least one of the address registers during execution of a current transfer operation.

6. An apparatus for controlling the transfer of data between at least one peripheral device and a central processor which includes a central memory having a plurality of data storage locations, said apparatus comprising; a buffer register for receiving data in the form of command words provided by said central processor, a pair of address registers for receiving signals from said buffer register, said signals representing the beginning and ending addresses of a block of said plurality of storage locations, one of said address registers controlling the transfer of data from said peripheral device to said data storage locations and the other of said address registers controlling the transfer of data from said data storage locations to said peripheral device, control means comprising logic circuits for receiving signals representing the data transfer operation to be executed, means for initiating said transfer operation controlling the transmission of data between said peripheral device and a selected one of said memory storage locations which is represented by said address registers, said control means including a means for receiving a signal from the central processor and effective in response to receipt of said signal to control the resetting of at least one of the address registers during execution of a current transfer operation.

7. An apparatus for controlling a transfer of data between at least one peripheral device and a central processor which includes a memory having a plurality of data storage locations, said apparatus comprising; a buffer register comprising a plurality of bistable devices for receiving command words initiated by said central processor, each of said command words comprising a plurality of signals, each of said signals controlling one of said bistable devices, a pair of address registers, control means comprising logic circuits for receiving signals from said buffer register and when enabled for transferring signals representing the condition of at least a first group of said bistable devices to said address registers, one of said address registers controlling the transfer of data from said peripheral device to said data storage means and the other of said address registers controlling the transfer of data from said data storage means to said peripheral device, means for initiating a data transfer operation controlling the transfer of data between said peripheral device and a related one of said memory storage locations which is represented by said address registers, said control means sensing signals representing a condition of a second group of the bistable device of said buffer register and upon sensing the condition of a predetermined bistable device causing the transfer of signals representing said first group of said command word from said buffer register to said address registers, said control means further comprising a device for receiving a signal from the central processor and effective in response to receipt of said signal to control the resetting of said address registers during operation of a current transfer operation.

8. An apparatus for controlling the transfer of data between at least one peripheral device and a central processor which includes a central memory having a plurality of data storage locations, said apparatus comprising; a buffer register for receiving data in the form of command words provided by said central processor, each of said command words comprising a plurality of signals, an address register for receiving a first group of said signals from said buffer register, said first group of signals representing the address of a block of said plurality of storage locations, control means comprising logic circuits for receiving from said buffer a second group of said signals representing the data transfer operation to be executed, means for initiating said transfer operation controlling the transmission of data between said peripheral device and a selected one of said memory storage locations which is represented by said address register, said control means including a device for receiving a signal from the central processor and effective in response to receipt of said signal to control the resetting of the address register at any time during execution of the current transfer operation and a central processor interrupt means comprising at least one bistable device interconnecting said central processor and said peripheral device, said peripheral device providing a signal under predetermined operating conditions for changing the condition of said bistable device, said bistable device interrupting said central processor during the execution of said command words without interrupting the operation of the apparatus.

9. An apparatus for controlling the transfer of data between at least one peripheral device and a central processor which includes a memory having a plurality of data storage locations, said apparatus comprising; data transfer means for receiving a command specifying a particular data transfer operation from said central processor and responsive to said command to transfer data between said peripheral device and a region of said memory; register means for storing address data representing said region of said memory, address transfer means for transferring said address data to said memory for controlling access of said data transfer means to said region; and control means for receiving signals from said central processor and responsive to said signals for modifying the address data in said register to represent a different region of said memory during execution of said command.

10. An apparatus for controlling the transfer of data between at least one peripheral device and a central processor which includes a memory having a plurality of data storage locations, said apparatus comprising; data transfer means for receiving from said central processor a command comprising a plurality of signals specifying a particular data transfer operation, and responsive to a first group of said signals of said command to transfer data between said peripheral device and a region of said memory; register means for storing address data representing said region of said memory; means for transferring a second group of said signals to said register means; address transfer means for transferring said address data from said register means to said memory for controlling access of said data transfer means to said region; and control means for receiving further commands comprising a plurality of signals from said central processor and responsive to said latter signals for modifying the address data in said register means to represent a different region of said memory during execution of said command.

11. An information handling apparatus including a central processor, a memory, a digital input output buffer, a plurality of input devices, a plurality of output devices, and a controller selector; first means for transferring data between said central processor and said memory and second means for transferring data between said input and output devices and said memory through said digital input output buffer and said controller selector, third means for providing communication between said central processor and said digital input output buffer, said digital input output buffer including means for generating a first interrupt control signal, means responsive to said first interrupt control signal to interrupt the transfer of data between said central processor and said memory and to commence the transfer of data from said digital input output buffer to said memory, said central processor including means for generating a second interrupt control signal, means responsive to said second interrupt control signal to interrupt the transfer of data from said digital input output buffer to said memory and to initiate transfer of data from said memory to said digital input output buffer.

12. An information handling apparatus including a central processor, a memory, a digital input output buffer, a plurality of input devices, a plurality of output devices, and a controller selector; first means for transferring data between said central processor and said memory and second means for transferring data between said input and output devices and said memory through said digital input output buffer and said controller selector, third means for providing communication between said central processor and said digital input output buffer, said digital input output buffer including means for generating a first interrupt control signal responsive to a signal from an input device, means responsive to said first interrupt control signal to interrupt the transfer of data between said central processor and said memory and to commence the transfer of data from said input device through said digital input output buffer to said memory, said central processor including means for generating a second interrupt control signal, means responsive to said second interrupt control signal to interrupt the transfer of data from said digital input output buffer to said memory and to initiate transfer of data from said memory to an output device through said digital input output buffer.

References Cited by the Examiner
UNITED STATES PATENTS

| | | | |
|---|---|---|---|
| 2,968,027 | 1/1961 | McDonnell et al. | 340—172.5 |
| 3,061,192 | 10/1962 | Terzian | 340—172.5 |
| 3,079,082 | 2/1963 | Scholten et al. | 340—172.5 |
| 3,200,380 | 8/1965 | MacDonald et al. | 340—172.5 |
| 3,221,309 | 11/1965 | Benghait | 340—172.5 |
| 3,222,647 | 12/1965 | Strachey | 340—172.5 |
| 3,226,694 | 12/1965 | Wise | 340—172.5 |

ROBERT C. BAILEY, *Primary Examiner.*

P. J. HENON, *Assistant Examiner.*